US012402021B2

(12) United States Patent
Dong

(10) Patent No.: US 12,402,021 B2
(45) Date of Patent: Aug. 26, 2025

(54) METHOD AND APPARATUS FOR CONFIGURED GRANT PHYSICAL UPLINK SHARED CHANEL TRANSMISSION USING MULTIPLE BEAMS

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 407 days.

(21) Appl. No.: 17/997,777

(22) PCT Filed: May 9, 2020

(86) PCT No.: PCT/CN2020/089488

§ 371 (c)(1),
(2) Date: Nov. 2, 2022

(87) PCT Pub. No.: WO2021/226766

PCT Pub. Date: Nov. 18, 2021

(65) Prior Publication Data

US 2023/0164584 A1 May 25, 2023

(51) Int. Cl.
*H04W 16/28* (2009.01)
*H04W 72/1268* (2023.01)
*H04W 72/23* (2023.01)

(52) U.S. Cl.
CPC ....... *H04W 16/28* (2013.01); *H04W 72/1268* (2013.01); *H04W 72/23* (2023.01)

(58) Field of Classification Search
CPC . H04W 16/28; H04W 72/1268; H04W 72/23; H04W 72/046; H04W 72/231; H04W 72/232; H04B 7/06952; H04B 7/088; H04B 7/0695; H04B 7/0408; H04B 7/0617
See application file for complete search history.

(56) References Cited

U.S. PATENT DOCUMENTS 8,792,577 B2 * 7/2014 Verikoukis ............ H04L 1/0026 375/267
2019/0306924 A1 10/2019 Zhang et al.
2019/0320469 A1 10/2019 Huang et al.
2021/0167901 A1 * 6/2021 Tang ................. H04W 72/0446
(Continued)

FOREIGN PATENT DOCUMENTS

CN 107889113 A 4/2018
WO WO 2019156472 A1 8/2019
(Continued)

OTHER PUBLICATIONS

Specification from U.S. Appl. No. 62/976,268 (Year: 2020).*
(Continued)

*Primary Examiner* — Afshawn M Towfighi
(74) *Attorney, Agent, or Firm* — Finnegan, Henderson, Farabow, Garrett & Dunner, L.L.P.

(57) ABSTRACT

A data transmitting method is performed by a terminal, and includes: receiving beam indication information, wherein the beam indication information is configured to indicate a plurality of transmission beams for a configured grant Physical Uplink Shared Channel (CG-PUSCH); and transmitting data on the CG-PUSCH using the plurality of transmission beams.

17 Claims, 8 Drawing Sheets

130
120
120
120
120
110
110
110
110
110

(56) References Cited

U.S. PATENT DOCUMENTS

2021/0203397 A1* 7/2021 Xiong ................. H04W 72/046
2021/0400649 A1* 12/2021 Kang ..................... H04B 7/088

FOREIGN PATENT DOCUMENTS

WO WO 2020044409 A1 3/2020
WO WO 2020069740 A1 4/2020
WO WO 2020091470 A1 5/2020

OTHER PUBLICATIONS

International Search Report and Written Opinion of International Application No. PCT/CN2020/089488, mailed Jan. 27, 2021, 15 pages.

Notice of Reasons for Refusal for Japanese Application No. 2022-567662, issued on Oct. 17, 2023, 14 pages.

European Patent Office, Extended European Search Report issued in Application No. 20935429.9, dated Nov. 21, 2023, 11 pages.

Notice for the fourth trial issued by China State Intellectual Property Rights Bureau on Jan. 13, 2025, in corresponding Application No. CN 202080000928.3, 23 pages.

Notice of the first review opinion issued by Korean Patent Office on Jan. 8, 2025, in corresponding Application No. KR 10-2022-7041306, 12 pages.

MCC Support, Draft Report of 3GPP TSG RAN WG1 #96b v0.1.0 (Xi'an, China, Apr. 8-12, 2019), 3GPP TSG RAN WG1 Meeting #97, R1-190xxxx, Reno, USA, May 13-17, 2019 159 pages.

Huawei, HiSilicon, Summary of AI: 7.2.8.2 Enhancements on Multi-TRP/Panel Transmission of Offline Discussion, 3GPP TSG RAN WG1 Meeting #96, R1-190abcd, Athens, Greece, Feb. 25-Mar. 1, 2019, 59 pages.

* cited by examiner

METHOD AND APPARATUS FOR CONFIGURED GRANT PHYSICAL UPLINK SHARED CHANEL TRANSMISSION USING MULTIPLE BEAMS

CROSS-REFERENCE TO RELATED APPLICATION

This application is a U.S. national phase application of International Application No. PCT/CN2020/089488, filed on May 9, 2020, the content of which is hereby incorporated by reference in its entirety.

TECHNICAL FIELD

The disclosure relates to but not limited to a field of wireless communication technologies, especially to a data transmitting method and apparatus, a communication device and a storage medium.

BACKGROUND

In the Release 15 (R15) protocol, the configured grant Physical Uplink Shared Channel (CG-PUSCH) can be configured through Radio Resource Control (RRC). For the type A CG-PUSCH, the period and offset of the CG-PUSCH and the specific time-frequency position occupied in each slot are configured through RRC layer signaling. For type B CG-PUSCH, the period of the CG-PUSCH is configured by the RRC layer signaling and then the offset and the specific time-frequency position occupied in each slot are configured through activation Downlink Control Information (DCI).

SUMMARY

Embodiments of the disclosure provide a data transmitting method performed by a terminal. The method includes:

- receiving beam indication information, in which the beam indication information is configured to indicate a plurality of transmission beams for a configured grant Physical Uplink Shared Channel (CG-PUSCH); and
- transmitting data on the CG-PUSCH using the plurality of transmission beams.

According to a second aspect of embodiments of the disclosure, there is provided a data receiving method, performed by a base station, the method includes:

- transmitting beam indication information, in which the beam indication information is configured to indicate a plurality of transmission beams for a configured grant Physical Uplink Shared Channel (CG-PUSCH); and
- receiving data transmitted using the plurality of transmission beams on the CG-PUSCH.

According to a third aspect of embodiments of the disclosure, there is provided a communication device, including:

- an antenna;
- a memory; and
- a processor, connected to the antenna and the memory and configured to control transmission and reception of the antenna and perform a method of any embodiment of the disclosure.

DETAILED DESCRIPTION

Embodiments will be described in detail below, where examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the disclosure. The singular forms of “a” and “the” used in the disclosure and appended claims are also intended to include plural forms, unless the context clearly indicates other meanings. It is also understandable that the term “and/or” as used herein refers to and includes any or all possible combinations of one or more associated listed items.

It is understandable that although the terms first, second, and third may be used in this disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the terms “if” and “in response to” as used herein can be interpreted as “when”, “while” or “in response to determining”.

Figure 1:
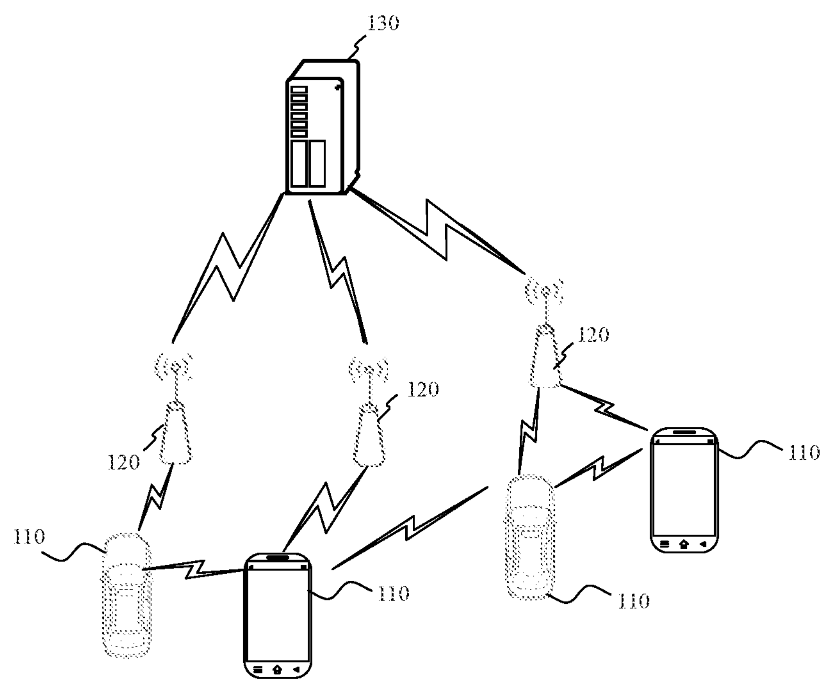
FIG. 1 is a schematic diagram illustrating a wireless communication system.

FIG. 1 is a schematic diagram illustrating a wireless communication system according to embodiments of the disclosure. As illustrated in FIG. 1, the wireless communication system is a communication system based on cellular mobile communication technology. The wireless communication system may include several user equipment (UEs) 110 and several base stations 120.

The UE 110 may be a device that provides voice and/or data connectivity to the user. The UE 110 may communicate with one or more core networks via a Radio Access Network (RAN). The UE 110 may be an Internet of Thing (IoT) UE such as a sensor device, a mobile phone (or "cellular" phone), or a computer with an IoT terminal, such as a fixed device, a portable device, a pocket device, a hand-held device, a computer built-in device or a vehicle-mounted device. For example, Station (STA), subscriber unit, subscriber station, mobile station, mobile, remote station, access point, remote terminal, access terminal, user terminal, user agent, user device, or UE. Alternatively, the terminal 11 may be a device of unmanned aerial vehicle. Alternatively, the UE 110 may be a vehicle-mounted device, such as a trip computer with a wireless communication function, or a wireless communication device externally connected to the trip computer. Alternatively, the UE 110 may be a roadside device, such as a street light, a traffic light, or other roadside devices with a wireless communication function.

The base station 120 may be a network side device in the wireless communication system. The wireless communication system may be the 4th generation mobile communication (4G) system, also known as Long Term Evolution (LTE) system. Alternatively, the wireless communication system may be a 5th generation mobile communication (5G) system, also known as new radio (NR) system or 5G NR system. Alternatively, the wireless communication system may be a next-generation system of the 5G system. The access network in the 5G system may be called New Generation-Radio Access Network (NG-RAN).

The base station 120 may be an evolved base station (eNB) of the 4G system. Alternatively, the base station 120 may be a base station (gNB) that adopts a centralized-distributed architecture of the 5G system. When adopting the centralized-distributed architecture, the base station 120 usually includes a central unit (CU) and at least two distributed units (DU). The central unit is provided with a protocol stack of Packet Data Convergence Protocol (PDCP), Radio Link Control (RLC), and Medium Access Control (MAC). The distributed unit is provided with a protocol stack of a physical (PHY) layer. Embodiments of the disclosure not limit the implementation form of the base station 120.

A wireless connection can be established between the base station 120 and the UE 110 through a wireless air interface. In different implementations, the wireless air interface can be a wireless air interface based on the 4G or based on 5G, such as the wireless air interface or the new radio, or the wireless air interface can be a wireless air interface based on the next-generation of the 5G.

In some embodiments, an End to End (E2E) connection can be established between UEs 110. For example, Vehicle to Vehicle (V2V) communication, Vehicle to Infrastructure (V2I) and Vehicle to Pedestrian (V2P) communication in the Vehicle to Everything (V2X) communication.

Here, it may be considered that the above-mentioned UE is the terminal or the terminal device involved in following embodiments.

In some embodiments, the wireless communication device further includes a network management network 130.

The base stations 120 are respectively connected to the network management device 130. The network management device 130 may be a core network device in the wireless communication system. As an example, the network management device 130 may be a Mobility Management Entity (MME) in an Evolved Packet Core (EPC). As another example, the network management device can be another core network device, such as Serving GateWay (SGW), Public Data Network GateWay (PGW), Policy and Charging Rules Function (PCRF), or Home Subscriber Server (HSS), etc. Embodiments of the disclosure do not limit the implementation form of the network management device 130.

In order to facilitate the understanding of any embodiment of the disclosure, a scenario of data transmission is described below.

For a set of CG-PUSCHs, one transmission beam is indicated in the RRC signaling or the DCI, which means that the same transmission beam is used to transmit data for all Physical Uplink Shared Channels (PUSCHs) in the set of CG-PUSCHs. Here, since the direction of the transmission beam is fixed, if there is interference in this direction, there will be interference on the respective PUSCH when the terminal uses the transmission beam to transmit data on each PUSCH, which affects data transmission. In the release 16 (R16) New Radio in Unlicensed Spectrum (NR-U) standard design, compared to the configured grant Physical Uplink Shared Channel (CG-PUSCH) design in the Release 15 (R15) protocol, the CG-PUSCH design adds extended content of N slots, where N is a positive integer greater than 1. For example, N equals to 4. Here, the extension of N slots is to transmit different uplink data on consecutive N slots, not for repetition.

Figure 2:
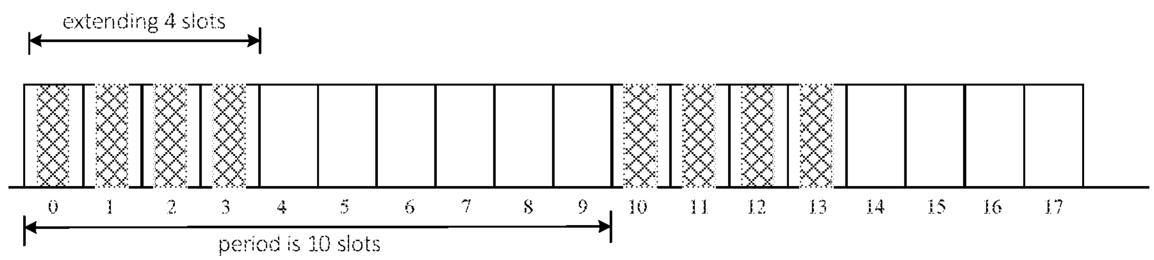
FIG. 2 is a schematic diagram of transmitting data on CG-PUSCH according to some embodiments.

As illustrated in FIG. 2, the shaded parts represent the CG-PUSCH, and the symbol positions of the shaded parts are the same for all slots. In one embodiment, the shaded part may occupy the entire slot. In FIG. 2, the configured period of the CG-PUSCH is 10 slots, and 4 slots in each configured period are configured to transmit data on the CG-PUSCH.

In one embodiment, on the unlicensed spectrum, when there is uplink data to be transmitted by the terminal, the terminal will perform channel monitoring (i.e., the Clear Channel Assessment (CCA)) first. The uplink data can be sent only after the CCA detection is successful, that is, the interference value on the detected channel is lower than a threshold. The above is the mechanism of listening before talking. In the case where the terminal has a plurality of transmission beams, the beam used by the terminal to perform the channel detection is the same as the transmission beam used by the terminal to transmit the uplink data. In addition, since different transmission beams of the terminal have different reception effects on interference and noise in different spatial directions, the interference values of signals detected by the terminal on different beams will also be different.

Figure 3:
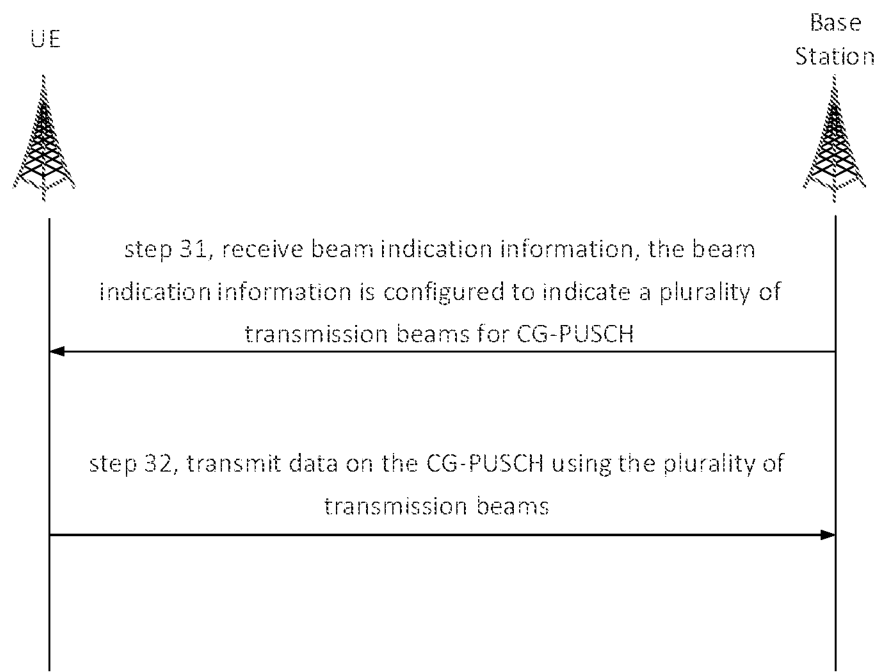
FIG. 3 is a flowchart illustrating a data transmitting method according to some embodiments.

As illustrated in FIG. 3, embodiments provide a data transmitting method performed by a terminal. The method includes the following.

In step 31, beam indication information is received. The beam indication information is configured to indicate a plurality of transmission beams for a CG-PUSCH.

In some examples, the terminal may be, but is not limited to, a mobile phone, a wearable device, a vehicle-mounted terminal, a Road Side Unit (RSU), a smart home terminal, an industrial sensor device, and/or a medical device, etc.

In some examples, the beam indication information may at least indicate two transmission beams. For example, the beam indication information may indicate 2 beams, 3 beams, or 5 beams.

In some examples, the beam indication information is information that carries identifiers of a plurality of transmission beams determined by the base station for the terminal to transmit data on the CG-PUSCH.

In some examples, the beam indication information may carry Sounding Reference Signal (SRS) Resource Indicator (SRI, srs-ResourceIndicator) values indicated by the SRIs.

In some examples, different SRI values are associated with different transmission beams. For example, a first SRI value is associated with a first transmission beam and a second SRI value is associated with a second transmission beam.

In some examples, one SRI value is associated with one transmission beam. The beam indication information may carry a plurality of SRI values. In this way, after receiving the SRI values, the transmission beams can be determined.

In some examples, the transmission beams are configured to be selected by the terminal to transmit uplink data on the CG-PUSCH.

In some examples, the transmission beam may be a beam recommended or suggested by the base station to the terminal for transmitting uplink data on the CG-PUSCH.

In some examples, a strength value of an interference signal when data is transmitted using each transmission beam recommended or suggested by the base station to the terminal for transmitting the uplink data on the CG-PUSCH is less than a preset threshold. In this way, the terminal can perform reliable uplink data transmission using these transmission beams.

In some examples, the base station is the interface device for the terminal to access the network. The base station can be any type of base stations, for example, 3G base stations, 4G base stations, 5G base stations, or other evolved base stations.

In some examples, licensed spectrums or unlicensed spectrums may be configured for the CG-PUSCH.

Figure 4:
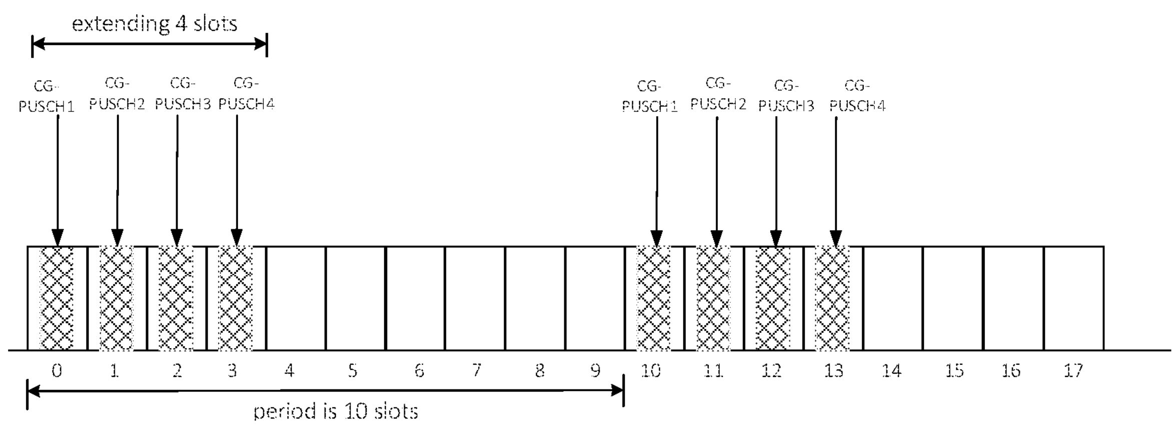
FIG. 4 is a schematic diagram of transmitting data on CG-PUSCH according to some embodiments.

In some examples, as illustrated in FIG. 4, there may be 4 CG-PUSCHs in one configured period, which are CG-PUSCH1, CG-PUSCH2, CG-PUSCH3, and CG-PUSCH4 respectively.

Here, one CG-PUSCH can occupy all or part of symbols of one slot. For example, the CG-PUSCH1 may occupy all symbols in the $0^{th}$ slot, or the CG-PUSCH1 may occupy the $3^{rd}$ to the $4^{th}$ symbols in the $0^{th}$ slot.

In some examples, the terminal may select part or all of the transmission beams from the plurality of transmission beams indicated by the beam indication information to transmit the uplink data.

In some examples, different transmission beams have different transmission angles and sector ranges in space.

In some examples, the angle between different transmission beams is less than a preset angle threshold.

In some examples, the sector ranges of the plurality of transmission beams in space may be on the same plane.

In some examples, the sector ranges of the plurality of transmission beams in the space may occupy a three-dimensional space.

In some examples, when the CG-PUSCH is a dedicated channel allocated to a certain terminal, the beam indication information may be transmitted using Radio Resource Control (RRC) signaling.

In step 32, data is transmitted on the CG-PUSCH using the plurality of transmission beams.

In some examples, the terminal may use different transmission beams to transmit the same uplink data.

In some examples, the beam indication information indicates 4 transmission beams, which are transmission beam 1, transmission beam 2, transmission beam 3, and transmission beam 4. There can be 4 CG-PUSCHs in one configured period, which are CG-PUSCH1, CG-PUSCH2, CG-PUSCH3, and CG-PUSCH4.

As illustrated in FIG. 4, in some examples, the CG-PUSCH1 uses the transmission beam 1 to transmit the uplink data; the CG-PUSCH2 uses the transmission beam 2 to transmit the uplink data; the CG-PUSCH3 uses the transmission beam 3 to transmit the uplink data; and the CG-PUSCH4 uses the transmission beam 4 transmit the uplink data.

In other examples, it is possible that the CG-PUSCH1 and the CG-PUSCH3 use the transmission beam 1 to transmit the uplink data and the CG-PUSCH2 and the CG-PUSCH4 use the transmission beam 2 to transmit the uplink data.

In embodiments of the disclosure, based on the plurality of transmission beams indicated by the beam indication information, the data is transmitted on the CG-PUSCH using the plurality of transmission beams. Since transmission directions of different transmission beams in space can be different, the interference received in different directions in space will be different. Compared to using the same transmission beam to transmit data on the CG-PUSCH, using the plurality of transmission beams to transmit data on the CG-PUSCH can improve the anti-interference ability of data transmission and improve the reliability of data transmission.

Figure 5:
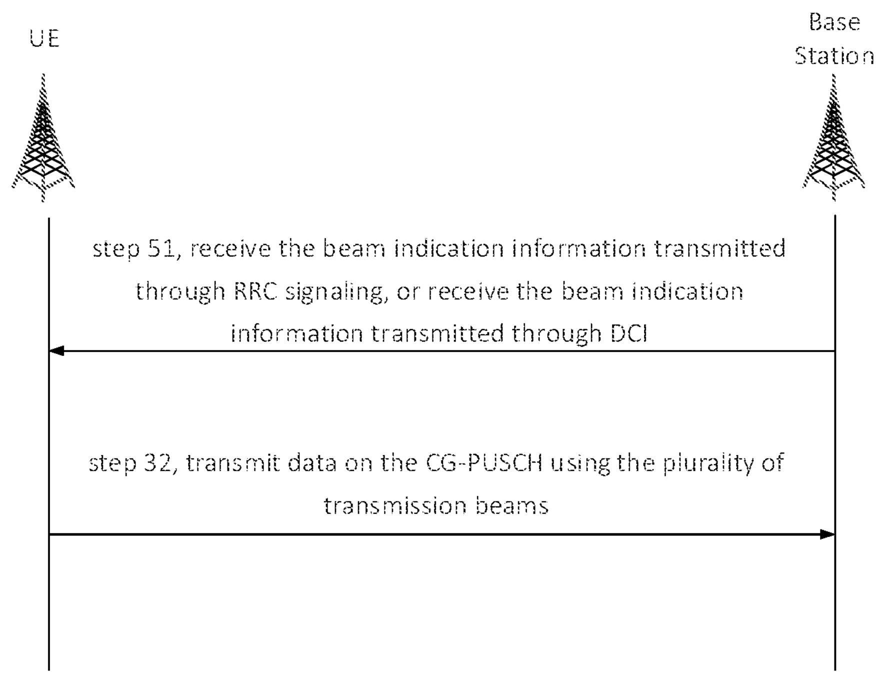
FIG. 5 is a flowchart illustrating a data transmitting method according to some embodiments.

As illustrated in FIG. 5, embodiments provide a data transmitting method. The step 31 of receiving beam indication information includes the following.

In step 51, beam indication information transmitted through Radio Resource Control (RRC) signaling is received or beam indication information transmitted through physical Downlink Control Information (DCI) is received.

In some examples, the RRC signaling may include RRC connection reconfiguration (RRCConnectionReconfiguration) signaling carrying the beam indication information and the terminal receives the beam indication information transmitted through the RRC connection reconfiguration (RRCConnectionReconfiguration). In this way, the existing RRC signaling can be used to carry the beam indication information, the multiplexing of the RRC signaling is realized, and the compatibility of the signaling is improved.

In some examples, the beam indication information may be included in the DCI that is configured to schedule the CG-PUSCH.

For example, the DCI includes: Sounding Reference Signal Resource Indicator (SRI, srs-ResourceIndicator) values indicated by the SRIs.

In some examples, different SRI values are associated with different beams. One DCI may contain a plurality of SRI values.

In some examples, the DCI is an activation DCI for activating the CG-PUSCH to transmit data.

In some examples, the activation DCI also indicates a slot offset of the CG-PUSCH in each CG-PUSCH configured period and a specific time-frequency position occupied by the CG-PUSCH in each slot, etc.

Here, the existing activation DCI can be used to carry the downlink beam indication information, which realizes the multiplexing of the activation DCI and improves the compatibility of the activation DCI.

Figure 6:
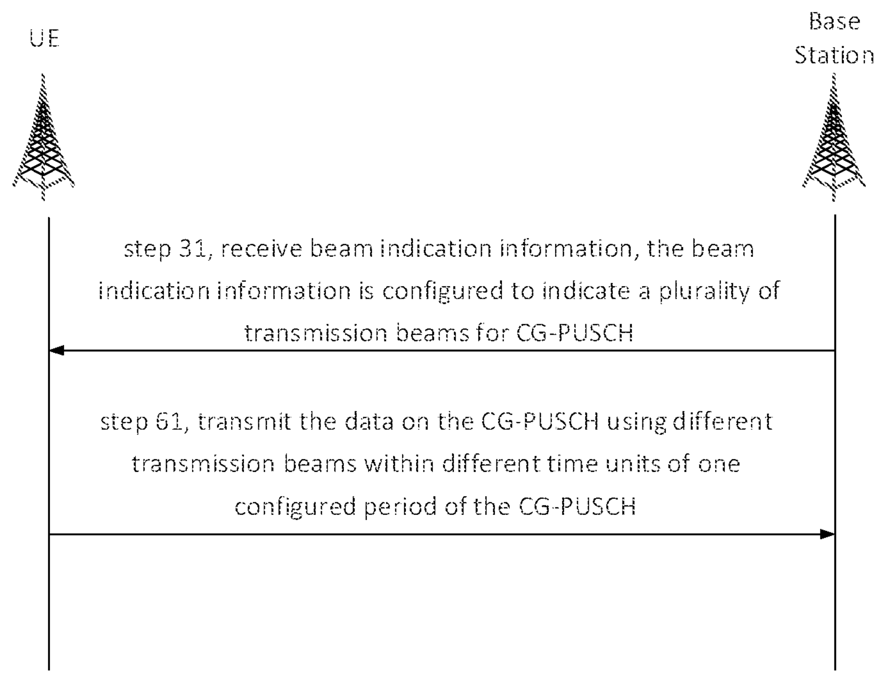
FIG. 6 is a flowchart illustrating a data transmitting method according to some embodiments.

As illustrated in FIG. 6, in the data transmitting method, the step 32 of transmitting the data on the CG-PUSCH using the plurality of transmission beams includes the following.

In step 61, the data is transmitted using different transmission beams on the CG-PUSCH within different time units of one configured period of the CG-PUSCH.

In some examples, one configured period may include a plurality of time units. The time unit can be one symbol or a plurality of consecutive symbols. Alternatively, the time unit can be one slot or a plurality of consecutive slots.

In some examples, the plurality of transmission beams include transmission beam 1, transmission beam 2, transmission beam 3, transmission beam 4, and transmission beam 5. One configured period includes 10 time units, where 4 consecutive time units of one configured period are allocated to the CG-PUSCH, which are time unit 1, time unit 2, and time unit 3 and time unit 4. Therefore, any 4 transmission beams can be selected from the plurality of transmission beams for the terminal to transmit data on the CG-PUSCH within 4 time units. In an example, the terminal selects the four transmission beams, namely, the transmission beam 1, the transmission beam 2, the transmission beam 4, and the transmission beam 5. Within the time unit 1, the data is transmitted on the CG-PUSCH using the transmission beam 1; within the time unit 2, the data is transmitted on the CG-PUSCH using the transmission beam 2; within the time unit 3, the data is transmitted on the CG-PUSCH using the transmission beam 4; and within the time unit 4, the data is transmitted on the CG-PUSCH using the transmission beam 5.

Figure 7:
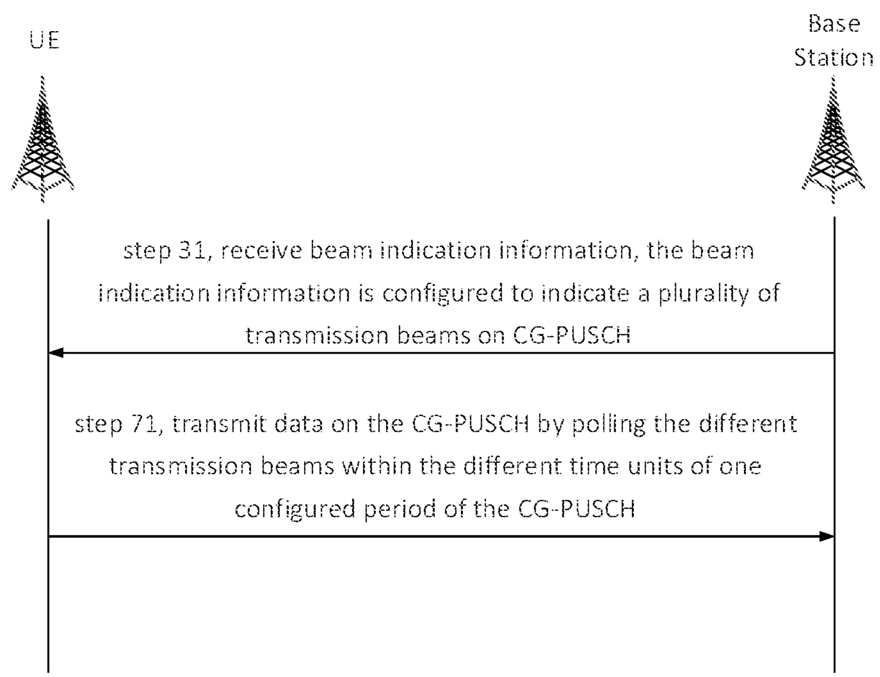
FIG. 7 is a flowchart illustrating a data transmitting method according to some embodiments.

As illustrated in FIG. 7, embodiments of the disclosure provide a data transmitting method. The step 61 of transmitting the data on the CG-PUSCH using the different transmission beams within different time units of one configured period of the CG-PUSCH includes the following.

In step 71, the data is transmitted on the CG-PUSCH by polling the different transmission beams within different time units of one configured period of the CG-PUSCH.

In some examples, polling the different transmission beams to transmit the data can be periodically and sequentially using each of the plurality of transmission beams in turn to transmit the data.

In some examples, the plurality of transmission beams include the transmission beam 1 and the transmission beam 2. One configured period includes 10 time units and four consecutive time units in each configured period are allocated to the CG-PUSCH. The 4 time units are the time unit 1, the time unit 2, the time unit 3, and the time unit 4. Therefore, the transmission beam 1 and the transmission beam 2 can be used to transmit data on the CG-PUSCH within the 4 time units. In some examples, within the time unit 1, the transmission beam 1 is used to transmit data on the CG-PUSCH1; within the time unit 2, the transmission beam 2 is used to transmit data on the CG-PUSCH2; within the time unit 3, the transmission beam 1 is used to transmit data on the CG-PUSCH3; and within the time unit 4, the transmission beam 2 is used to transmit data on the CG-PUSCH4.

In some examples, the plurality of transmission beams include transmission beam 1, transmission beam 2, transmission beam 3, and transmission beam 4. One configured period includes 10 time units. Four consecutive time units in each configured period are allocated to the CG-PUSCH, namely time unit 1, time unit 2, time unit 3, and time unit 4. Therefore, the transmission beam 1, the transmission beam 2, the transmission beam 3, and the transmission beam 4 can be used to transmit data on the CG-PUSCH within the 4 time units. In some examples, within the time unit 1, the transmission beam 1 is used to send data on the CG-PUSCH1; within the time unit 2, the transmission beam 2 is used to transmit data on the CG-PUSCH2; within the time unit 3, the transmission beam 3 is used to transmit data on the CG-PUSCH3; and within the time unit 4, the transmission beam 4 is used to transmit data on the CG-PUSCH4.

Figure 8:
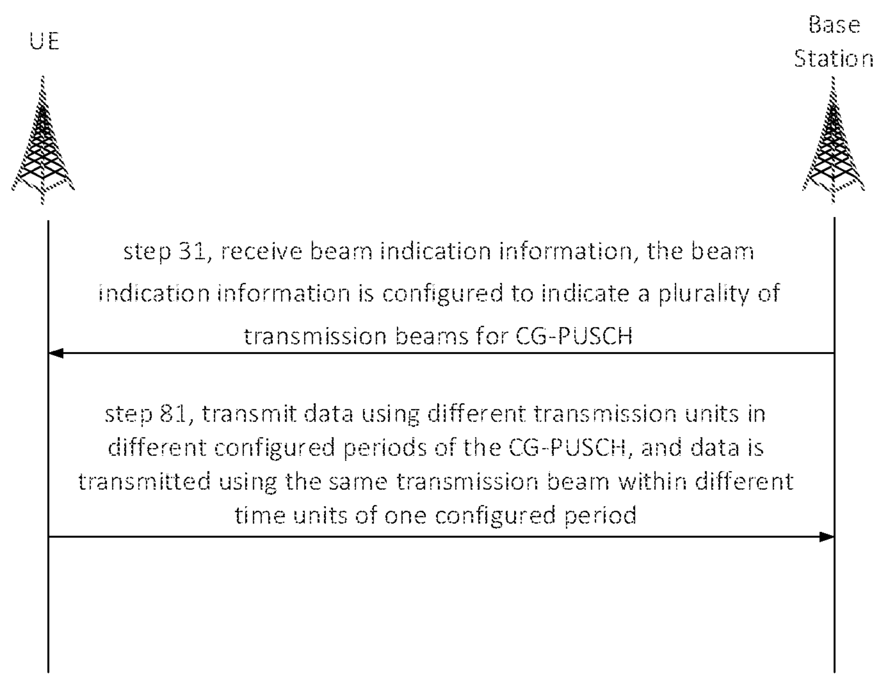
FIG. 8 is a flowchart illustrating a data transmitting method according to some embodiments.

As illustrated in FIG. 8, in the data transmitting data, the step 32 of transmitting the data on the CG-PUSCH using the plurality of transmission beams includes the following.

In step 81, the data is transmitted using different transmission beams in different configured periods of the CG-PUSCH, in which the data is transmitted using the same transmission beam within different time units of one configured period.

In some examples, the plurality of transmission beams include transmission beam 1, transmission beam 2, transmission beam 3, transmission beam 4, and transmission beam 5. One configured period includes 10 time units. Four consecutive time units in the configured period are allocated to the CG-PUSCH. The four time units of the first configured period are time unit 1, time unit 2, time unit 3, and time unit 4. The four time units of the second configured period are time unit 5, time unit 6, time unit 7 and time unit 8.

In some examples, in the first configured period, the terminal selects the beam 1 as the transmission beam. Within the time unit 1, the transmission beam 1 is used to transmit data on the CG-PUSCH; within the time unit 2, the transmission beam 1 is used to transmit data on CG-PUSCH: within the time unit 3, the transmission beam 1 is used to transmit data on the CG-PUSCH; within time unit 4, the transmission beam 1 is used to transmit data on the CG-PUSCH.

In some examples, in the second configured period, the terminal selects the transmission beam 2 as the transmission beam. Within the time unit 5, the transmission beam 2 is used to transmit data on the CG-PUSCH; within the time unit 6, the transmission beam 2 is used to transmit data on the CG-PUSCH; within the time unit 7, the transmission beam 2 is used to transmit data on the CG-PUSCH; within the time unit 8, the transmission beam 2 is used to transmit data on the CG-PUSCH.

Figure 9:
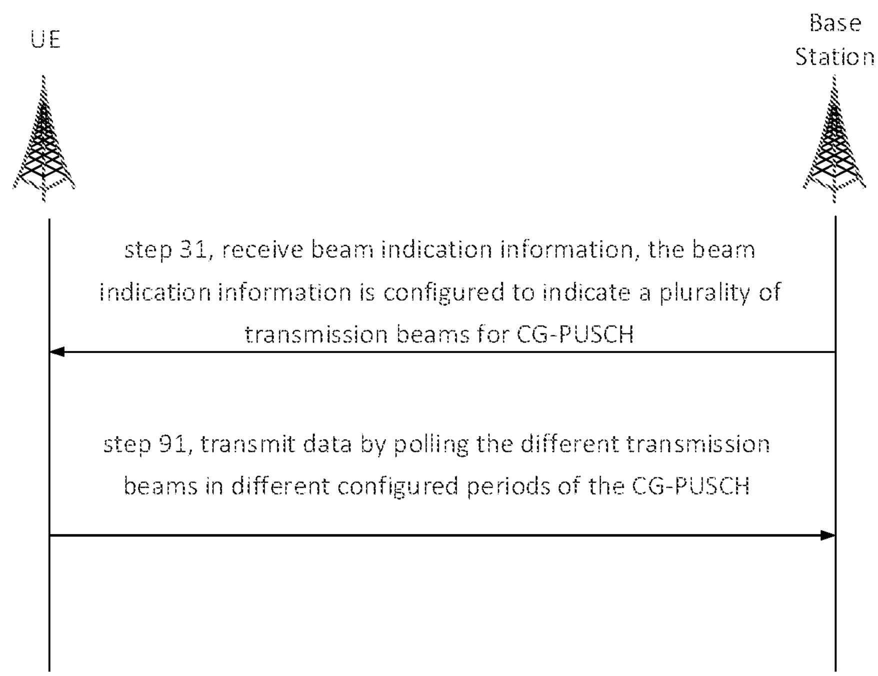
FIG. 9 is a flowchart illustrating a data transmitting method according to some embodiments.

As illustrated in FIG. 9, in the data transmitting method, the step 81 of transmitting the data using different transmission beams in different configured periods of the CG-PUSCH includes the following.

In step 91, in different configured periods of the CG-PUSCH, the data is transmitted by polling the different transmission beams.

In some examples, polling the different transmission beams to transmit the data can be periodically and sequentially using each of the plurality of transmission beams in turn to transmit the data.

In some examples, the plurality of transmission beams include beam 1 and beam 2. One configured period includes 10 time units, and 4 consecutive time units in each configured period are allocated to the CG-PUSCH. In some examples, four configured periods are included, namely configured period 1, configured period 2, configured period 3, and configured period 4. Therefore, in the 4 configured periods, the transmission beam 1 and the transmission beam 2 can be used to transmit data on the CG-PUSCH. In some examples, in the configured period 1, the transmission beam 1 is used to transmit data on the CG-PUSCH; in the configured period 2, the transmission beam 2 is used to transmit data on the CG-PUSCH; in the configured period 3, the transmission beam 1 is used to transmit data on the CG-PUSCH; and in the configured period 4, the transmission beam 2 is used to transmit data on the CG-PUSCH.

In some examples, the plurality of transmission beams include transmission beam 1, transmission beam 2, transmission beam 3, and transmission beam 4. One configured period includes 10 time units, and 4 consecutive time units in each configured period are allocated to the CG-PUSCH. In some examples, four configured periods are included, which are configured period 1, configured period 2, configured period 3, and configured period 4. Therefore, the transmission beam 1, the transmission beam 2, the transmission beam 3, and the transmission beam 4 can be used to transmit data on the CG-PUSCH in the 4 configured periods. In some examples, in the configured period 1, the transmission beam 1 is used to transmit data on the CG-PUSCH; in the configured period 2, the transmission beam 2 is used to transmit data on the CG-PUSCH; in the configured period 3, the transmission beam 3 is used to transmit data on the CG-PUSCH; and in the configured period 4, the transmission beam 4 is used to transmit data on the CG-PUSCH.

Figure 10:
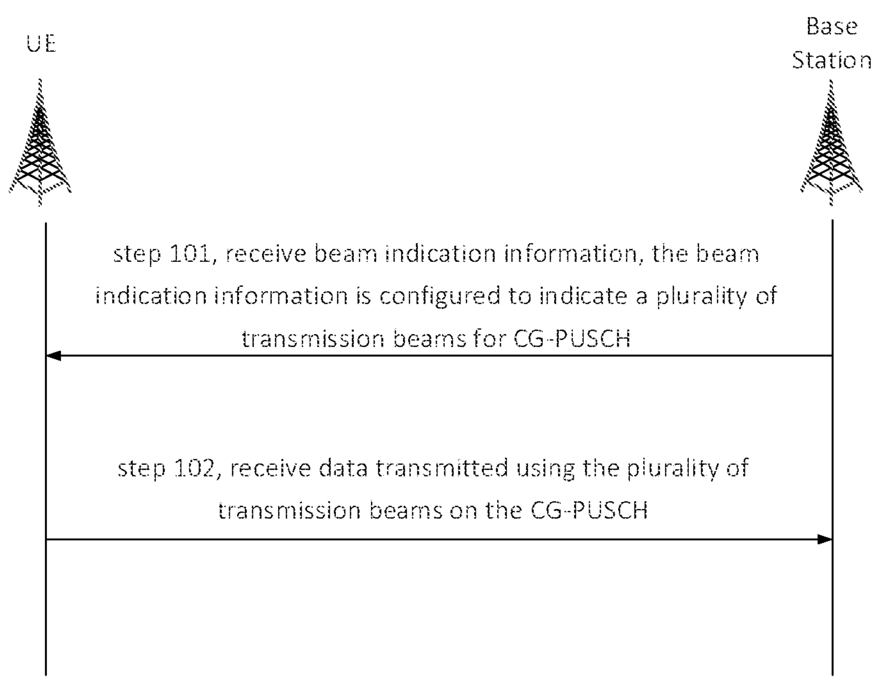
FIG. 10 is a flowchart illustrating a data transmitting method according to some embodiments.

As illustrated in FIG. 10, embodiments provide a data receiving method performed by a base station. The method includes the following.

In step 101, beam indication information is transmitted. The beam indication information is configured to indicate a plurality of transmission beams for a CG-PUSCH.

In some examples, the beam indication information at least indicates two transmission beams. For example, the beam indication information indicates 2 beams, 3 beams, or 5 beams.

In some examples, the transmission beams are configured to be selected by the terminal to transmit uplink data on the CG-PUSCH.

In some examples, the terminal may be, but is not limited to, a mobile phone, a wearable device, a vehicle-mounted terminal, a Road Side Unit (RSU), a smart home terminal, an industrial sensor device, and/or a medical device, etc.

In some examples, the transmission beams may be beams recommended or suggested by the base station to the terminal to transmit the uplink data on the CG-PUSCH.

In some examples, a strength value of an interference signal when the data is transmitted using each transmission beam recommended or suggested by the base station to the terminal for transmitting the uplink data on the CG-PUSCH is less than a preset threshold. In this way, the terminal uses these beams to perform reliable uplink data transmission.

In some examples, the base station is an interface device for the terminal to access the network. The base station may be any type of base stations, for example, 3G base stations, 4G base stations, 5G base stations, or other evolved base stations.

In some examples, the CG-PUSCH may be a licensed channel or an unlicensed channel.

In some examples, as illustrated in FIG. 4, there can be 4 CG-PUSCHs in one configured period, namely CG-PUSCH1, CG-PUSCH2, CG-PUSCH3, and CG-PUSCH4.

Here, one CG-PUSCH can occupy all or part of symbols of one slot. For example, the CG-PUSCH1 may occupy all symbols of the $0^{th}$ slot, or the CG-PUSCH1 may only occupy the $3^{rd}$ to $4^{th}$ symbols of the $0^{th}$ slot.

In some examples, the terminal may select part or all of the transmission beams from the plurality of transmission beams indicated by the beam indication information to transmit the uplink data.

In some examples, different transmission beams have different transmission angles and sector ranges in space.

In some examples, the angle between different transmission beams is less than a preset angle threshold.

In some examples, the sector ranges of the plurality of transmission beams in space may be on the same plane.

In some examples, the sector ranges of the plurality of transmission beams in the space may occupy a three-dimensional space.

In some examples, when the CG-PUSCH is a dedicated channel allocated to a certain terminal, the beam indication information may be transmitted through the RRC signaling.

In step 102, data transmitted on the CG-PUSCH using the plurality of transmission beams is received.

In some examples, the terminal may transmit the same uplink data using different transmission beams.

In other examples, the terminal transmits different uplink data using different transmission beams.

In some examples, the beam indication information indicates 4 transmission beams, which are transmission beam 1, transmission beam 2, transmission beam 3, and transmission beam 4. There may be 4 CG-PUSCHs in one configured period, which are CG-PUSCH1, CG-PUSCH2, CG-PUSCH3, and CG-PUSCH4. As illustrated in FIG. 4, in some examples, the CG-PUSCH1 uses the transmission beam 1 to transmit the uplink data; the CG-PUSCH2 uses the transmission beam 2 to transmit the uplink data; the CG-PUSCH3 uses the transmission beam 3 to transmit the uplink data; and the CG-PUSCH4 uses the transmission beam 4 to transmit the uplink data. In other examples, the CG-PUSCH1 and the CG-PUSCH3 use the transmission beam 1 to transmit the uplink data; and the CG-PUSCH2 and the CG-PUSCH4 use the transmission beam 2 to transmit the uplink data.

Figure 11:
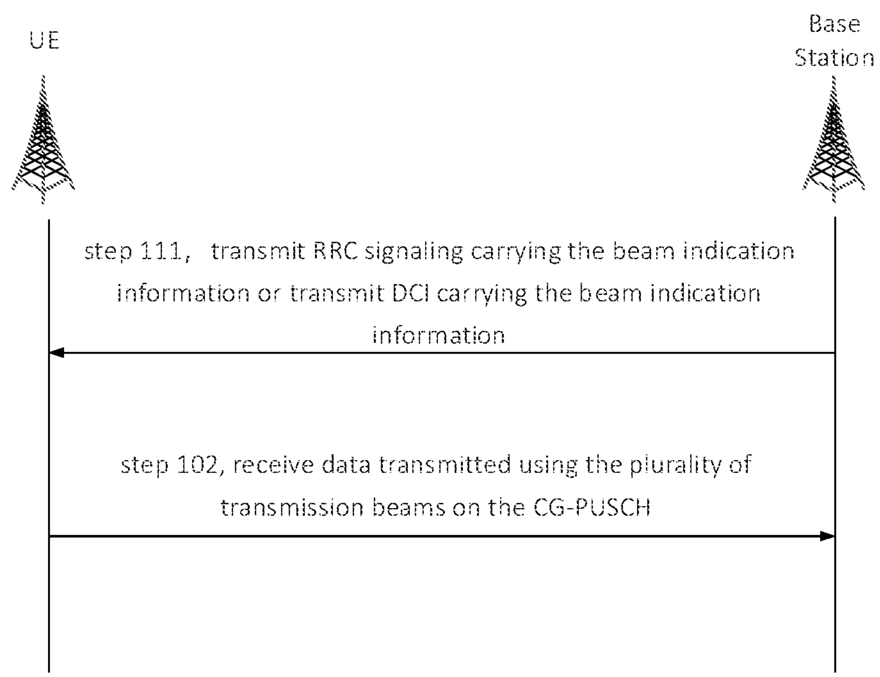
FIG. 11 is a flowchart illustrating a data transmitting method according to some embodiments.

As illustrated in FIG. 11, in the data receiving method, the step 101 of transmitting the beam indication information includes the following.

In step 111. RRC signaling carrying the beam indication information is transmitted; or DCI carrying the beam indication information is transmitted.

In some examples, the RRC signaling may include RRC connection reconfiguration (RRCConnectionReconfiguration) signaling that carries the beam indication information, and the base station uses the RRC connection reconfiguration (RRCConnectionReconfiguration) signaling to transmit the beam indication information. In this way, the existing RRC signaling can be used to carry the beam indication information, the multiplexing of the RRC signaling is realized, and the compatibility of the signaling is improved.

In some examples, the beam indication information may be included in the DCI configured to schedule the CG-PUSCH. For example, the DCI includes Sounding Reference Signal Resource Indicator (SRI, srs-ResourceIndicator) values indicated by the SRIs.

In some examples, different SRI values are associated with different beams. One DCI may contain a plurality of SRI values.

In some examples, the DCI is an activation DCI for activating the CG-PUSCH to transmit the data.

In some examples, the activation DCI also indicates a slot offset of the CG-PUSCH in each configured period of the CG-PUSCH and a specific time-frequency position occupied by the CG-PUSCH in each slot, etc.

Here, the existing activation DCI can be used to carry the downlink beam indication information, which realizes the multiplexing of the activation DCI and improves the compatibility of the activation DCI.

Figure 12:
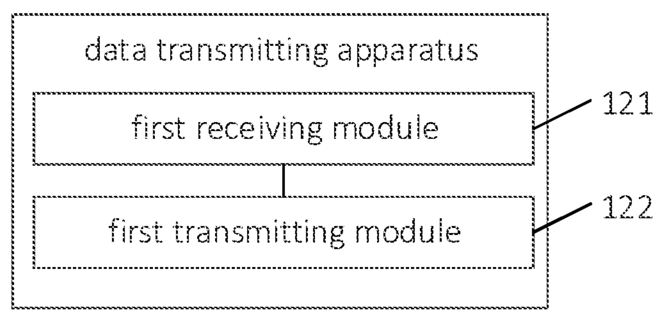
FIG. 12 is a block diagram illustrating a data transmitting apparatus according to some embodiments.

As illustrated FIG. 12, embodiments of the disclosure provide a data transmitting apparatus, applied to a terminal. The device includes a first receiving module 121 and a first transmitting module 122.

The first receiving module 121 is configured to receive beam indication information. The beam indication information is configured to indicate a plurality of transmission beams of a CG-PUSCH.

The first transmitting module 122 is configured to transmit data on the CG-PUSCH using the plurality of transmission beams.

In some examples, the first receiving module 121 is further configured to: receive the beam indication information transmitted through RRC signaling; or receive the beam indication information transmitted through DCI.

In some examples, the first receiving module 121 is further configured such that the DCI is activation DCI for activating the CG-PUSHC to transmit data.

In some examples, the first transmitting module 122 is further configured to transmit the data on the CG-PUSCH using different transmission beams within different time units of one configured period of the CG-PUSCH.

In some examples, the first transmitting module 122 is further configured to transmit the data on the CG-PUSCH by polling the different transmission beams within different time units of the one configured period of the CG-PUSCH.

In some examples, the first transmitting module 122 is further configured to transmit the data using different transmission beams in different configured periods of the CG-PUSCH, in which the data is transmitted using the same transmission beam within different time units of the same configured period.

In some examples, the first transmitting module 122 is further configured to transmit the data by polling the different transmission beams in different configured periods of the CG-PUSCH.

Figure 13:
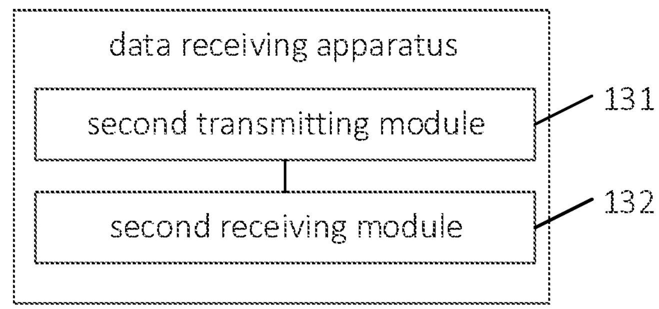
FIG. 13 is a block diagram illustrating a data transmitting apparatus according to some embodiments.

As illustrated in FIG. 13, embodiments of the disclosure provide a data receiving apparatus, applied in a base station. The apparatus includes a second transmitting module 131 and a second receiving module 132.

The second transmitting module 131 is configured to transmit beam indication information. The beam indication information is configured to indicate a plurality of transmission beams for a CG-PUSCH.

The second receiving module 132 is configured to receive data transmitted using the plurality of transmission beams on the CG-PUSCH.

In some examples, the second transmitting module 131 is further configured to transmit RRC signaling carrying the beam indication information; or transmit DCI carrying the beam indication information.

In some examples, the second transmitting module 131 is further configured such that the DCI is activation DCI for triggering the CG-PUSCH to transmit the data.

Regarding the apparatus in the foregoing embodiments, the specific manner in which each module performs the operation has been described in detail in the embodiments of the method, and will not be elaborated here.

Embodiments of the disclosure provide a communication device. The communication device includes a processor; a memory for storing processor executable instructions. The processor is configured to implement a method according to any embodiment of the disclosure when executing the processor executable instructions.

The processor may include various types of storage media. The storage media is a non-transitory computer storage medium that can continue to memorize and store information thereon after the communication device is powered off.

The processor may be connected to the memory through a bus or the like, and is used to read an executable program stored on the memory.

Embodiments of the disclosure further provide a computer storage medium. The computer storage medium has a computer executable program stored thereon, and the executable program is executed by a processor to implement the method described in any embodiment of the disclosure.

Regarding the apparatus in the foregoing embodiments, the specific manner in which each module performs operation has been described in detail in embodiments of the method, and detailed description will not be given here.

Figure 14:
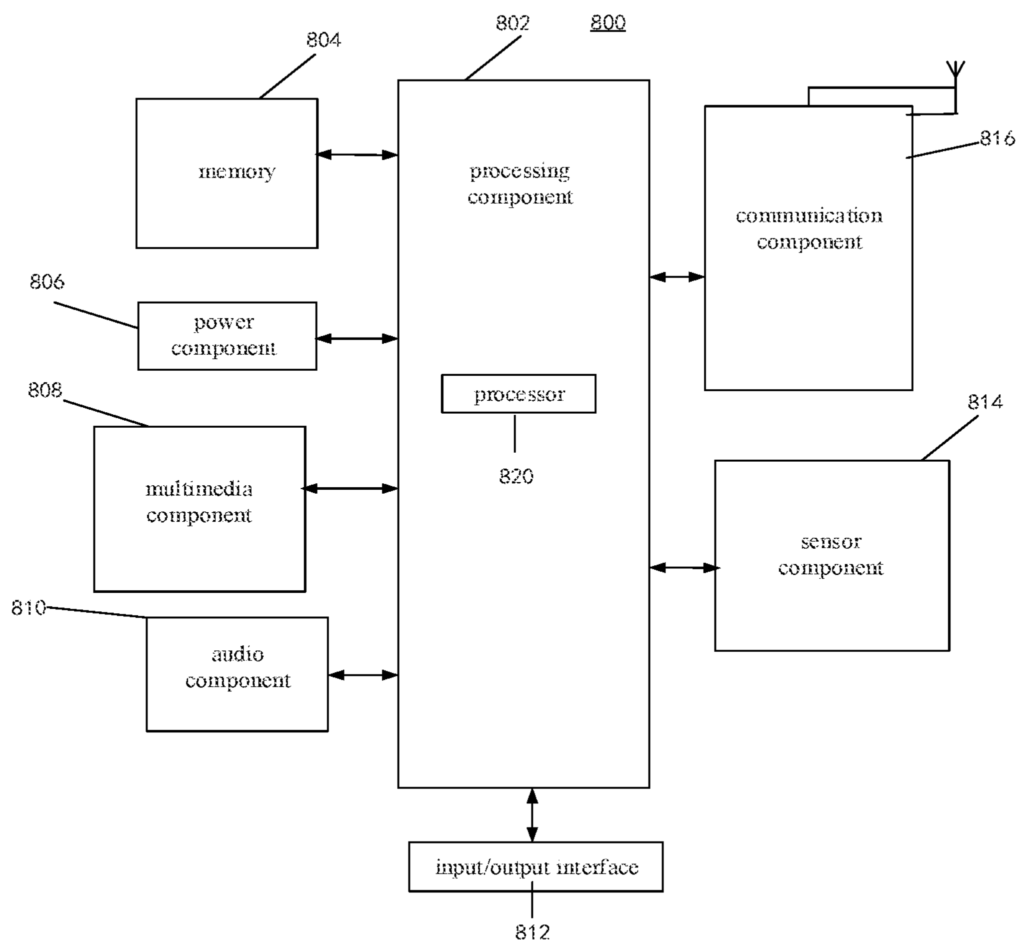
FIG. 14 is a block diagram illustrating user equipment according to some embodiments.

FIG. 14 is a block diagram illustrating a user equipment (UE) 800 according to some embodiments. For example, the UE 800 may be a mobile phone, a computer, a digital broadcasting UE, a message transceiver device, a game console, a tablet device, a medical device, a fitness device and a personal digital assistant.

As illustrated in FIG. 14, the UE 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the UE 800, such as the operations associated with display, telephone calls, data communications, camera operations, and recording operations. The processing component 802 may include at least one processor 820 to perform all or part of the steps in the above described method. Moreover, the processing component 802 may include at least one module which facilitate the interaction between the processing component 802 and other components. For example, the processing component 802 may include a multimedia module to facilitate the interaction between the multimedia component 808 and the processing component 802.

The memory 804 is configured to store various types of data to support the operation of the UE 800. Examples of such data include instructions for any applications or methods operated on the UE 800, contact data, phonebook data, messages, pictures, video, etc. The memory 804 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a programmable read-only memory (PROM), a Read-Only Memory (ROM), a magnetic memory, a flash memory, a magnetic or optical disk.

The power component 806 provides power to various components of the UE 800. The power component 806 may include a power management system, at least one power source, and any other components associated with the generation, management, and distribution of power in the UE 800.

The multimedia component 808 includes a screen providing an output interface between the UE 800 and the user. In some embodiments, the screen may include a Liquid Crystal Display (LCD) and a Touch Panel (TP). If the screen includes the touch panel, the screen may be implemented as a touch screen to receive input signals from the user. The touch panel includes at least one touch sensor to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front-facing camera and/or a rear-facing camera. When the UE 800 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 810 is configured to output and/or input audio signals. For example, the audio component 810 includes a microphone (MIC) configured to receive an external audio signal when the UE 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes at least one sensor to provide status assessments of various aspects of the UE 800. For instance, the sensor component 814 may detect an open/closed status of the UE 800, relative positioning of components, e.g., the display and the keypad, of the UE 800, a change in position of the UE 800 or a component of the UE 800, a presence or absence of user contact with the UE 800, an orientation or an acceleration/deceleration of the UE 800, and a change in temperature of the UE 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the UE 800 and other devices. The UE 800 can access a wireless network based on a communication standard, such as WiFi, 2G, or 3G, or a combination thereof. In an embodiment, the communication component 816 receives a broadcast signal or broadcast associated information from an external broadcast management system via a broadcast channel. In an embodiment, the communication component 816 further includes a near field communication (NFC) module to facilitate short-range communication. For example, the NFC module may be implemented based on a radio frequency identity (RFID) technology, an infrared data association (IrDA) technology, an ultra-wideband (UWB) technology, a Bluetooth (BT) technology, and other technologies.

In embodiments, the UE 800 may be implemented with at least one application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In embodiments, there is also provided a non-transitory computer readable storage medium including instructions, such as included in the memory 804, executable by the processor 820 in the UE 800, for performing the above method. For example, non-transitory computer-readable storage medium may be a ROM, a RAM, a CD-ROM, a magnetic tape, a floppy disc, an optical data storage device, and the like.

Figure 15:
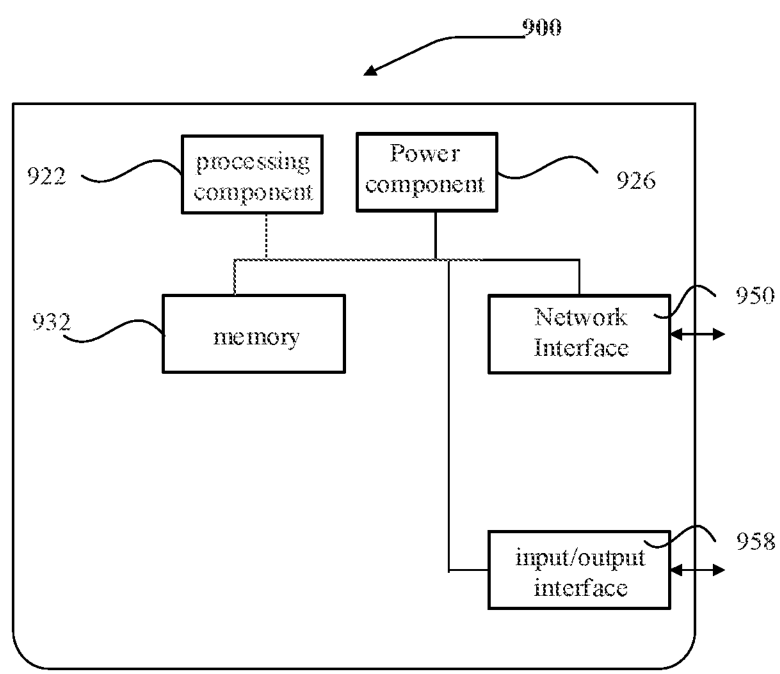
FIG. 15 is a block diagram illustrating a base station according to some embodiments.

As illustrated in FIG. 15, embodiments of the disclosure shows a structure of a base station. For example, the base station 900 may be provided as a network-side device. As illustrated in FIG. 15, the base station 900 includes a processing component 922, which includes at least one processors, and a memory resource represented by a memory 932 for storing instructions executable by the processing component 922, such as application programs. The application program stored in the memory 932 may include one or more modules, each module corresponds to a set of instructions. In addition, the processing component 922 is configured to execute instructions to perform the above method performed by the base station, for example, the method shown in FIGS. 2 to 11.

The base station 900 may also include a power component 926 configured to perform power management of the base station 900, a wired or wireless network interface 950 configured to connect the base station 900 to the network, and an input/output (I/O) interface 958. The base station 900 may operate based on an operating system stored on the memory 932, such as Windows Server™, Mac OS X™, Unix™, Linux™, FreeBSD™ or the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as examples only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A data transmitting method, performed by a terminal, the method comprising:

receiving beam indication information transmitted through Downlink Control Information (DCI), wherein the beam indication information is configured to indicate a plurality of transmission beams for a configured grant Physical Uplink Shared Channel (CG-PUSCH); and transmitting data on the CG-PUSCH using the plurality of transmission beams within a plurality of time units of one configured period, wherein the one configured period includes 10 time units, 4 consecutive time units of one configured period are allocated to the CG-PUSCH, and the DCI is an activation DCI for activating the CG-PUSCH to transmit data, the DCI indicates a slot offset of the CG-PUSCH in the configured period and a specific time-frequency position occupied by the CG-PUSCH in each slot.

2. The method of claim 1, wherein receiving the beam indication information comprises of:

receiving the beam indication information transmitted through Radio Resource Control (RRC) signaling.

3. The method of claim 1, wherein transmitting the data on the CG-PUSCH using the plurality of transmission beams comprises:

transmitting the data on the CG-PUSCH using different transmission beams within different time units of one configured period of the CG-PUSCH.

4. The method of claim 3, wherein transmitting the data on the CG-PUSCH using different transmission beams within different time units of one configured period of the CG-PUSCH comprises:

transmitting the data on the CG-PUSCH by polling the different transmission beams within different time units of the one configured period of the CG-PUSCH.

5. The method of claim 1, wherein transmitting the data on the CG-PUSCH using the plurality of transmission beams comprises:

transmitting the data using different transmission beams in different configured periods of the CG-PUSCH, wherein the data is transmitted using a same transmission beam within different time units of one configured period.

6. The method of claim 5, wherein transmitting the data using different transmission beams in different configured periods of the CG-PUSCH comprises:

transmitting the data by polling the different transmission beams in different configured periods of the CG-PUSCH.

7. A non-transitory computer-readable storage medium, having computer-executable programs stored thereon, wherein when the computer-executable programs are executed by a processor, the method of claim 1 is performed.

8. A data receiving method, performed by a base station, the method comprising:

transmitting beam indication information through Downlink Control Information (DCI), wherein the beam indication information is configured to indicate a plurality of transmission beams for a configured grant Physical Uplink Shared Channel (CG-PUSCH); and receiving data transmitted using the plurality of transmission beams on the CG-PUSCH within a plurality of time units of one configured period, wherein the one configured period includes 10 time units, 4 consecutive time units of one configured period are allocated to the CG-PUSCH, and the DCI is an activation DCI for activating the CG-PUSCH to transmit data, the DCI indicates a slot offset of the CG-PUSCH in the configured period and a specific time-frequency position occupied by the CG-PUSCH in each slot.

9. The method of claim 8, wherein transmitting the beam indication information comprises:

transmitting Radio Resource Control (RRC) signaling carrying the beam indication information.

10. A non-transitory computer-readable storage medium, having computer-executable programs stored thereon, wherein when the computer-executable programs are executed by a processor, the method of claim 8 is performed.

11. A communication device, comprising:

an antenna;

a memory storing executable instructions; and a processor connected to the antenna and the memory, wherein the processor is configured to:

receive beam indication information transmitted through Downlink Control Information (DCI), wherein the beam indication information is configured to indicate a plurality of transmission beams for a configured grant Physical Uplink Shared Channel (CG-PUSCH); and transmit data on the CG-PUSCH using the plurality of transmission beams within a plurality of time units of one configured period, wherein the one configured period includes 10 time units, 4 consecutive time units of one configured period are allocated to the CG-PUSCH, and the DCI is an activation DCI for activating the CG-PUSCH to transmit data, the DCI indicates a slot offset of the CG-PUSCH in the configured period and a specific time-frequency position occupied by the CG-PUSCH in each slot.

12. The communication device of claim 11, wherein the processor is further configured to perform at least one of:

receiving the beam indication information transmitted through Radio Resource Control (RRC) signaling; or receiving the beam indication information transmitted through Downlink Control Information (DCI).

13. The communication device of claim 12, wherein the DCI is an activation DCI for activating the CG-PUSCH to transmit data.

14. The communication device of claim 11, wherein the processor is further configured to:

transmit the data on the CG-PUSCH using different transmission beams within different time units of one configured period of the CG-PUSCH.

15. The communication device of claim 14, wherein the processor is further configured to:

transmit the data on the CG-PUSCH by polling the different transmission beams within different time units of the one configured period of the CG-PUSCH.

16. The communication device of claim 11, wherein the processor is further configured to:

transmit the data using different transmission beams in different configured periods of the CG-PUSCH, wherein the data is transmitted using a same transmission beam within different time units of one configured period.

17. The communication device of claim 16, wherein the processor is further configured to:

transmit the data by polling the different transmission beams in different configured periods of the CG-PUSCH.

* * * * *